(12) United States Patent
Haimer

(10) Patent No.: US 9,696,230 B2
(45) Date of Patent: Jul. 4, 2017

(54) BALANCING OR MEASURING ADAPTER

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

(*) Notice: Subject to any disclaimer, the term of this patent is extended or adjusted under 35 U.S.C. 154(b) by 189 days.

(21) Appl. No.: 14/434,793

(22) PCT Filed: Oct. 7, 2013

(86) PCT No.: PCT/EP2013/070764
§ 371 (c)(1),
(2) Date: Apr. 10, 2015

(87) PCT Pub. No.: WO2014/056815
PCT Pub. Date: Apr. 17, 2014

(65) Prior Publication Data
US 2015/0268123 A1    Sep. 24, 2015

(30) Foreign Application Priority Data

Oct. 10, 2012  (DE) .......... 10 2012 109 633

(51) Int. Cl.
| | | |
|---|---|---|
| *B31B 31/26* | (2006.01) | |
| *G01M 1/04* | (2006.01) | |
| *B23B 31/20* | (2006.01) | |
| *B23B 31/26* | (2006.01) | |

(52) U.S. Cl.
CPC .......... *G01M 1/04* (2013.01); *B23B 31/207* (2013.01); *B23B 31/265* (2013.01); *Y10T 279/17307* (2015.01)

(58) Field of Classification Search
CPC .............................. G01M 1/04; B23B 31/265
USPC .............................................. 73/487
See application file for complete search history.

(56) References Cited

U.S. PATENT DOCUMENTS

| | | | |
|---|---|---|---|
| 6,096,012 | A | 8/2000 | Bogert et al. |
| 6,612,791 | B1 | 9/2003 | Haimer |
| 7,201,547 | B2 | 4/2007 | Hangleiter |
| 7,704,022 | B2 | 4/2010 | Petrescu |

(Continued)

FOREIGN PATENT DOCUMENTS

| | | |
|---|---|---|
| DE | 29980181 | 9/2001 |
| DE | 697 09 599 | 8/2002 |

(Continued)

OTHER PUBLICATIONS

International Search Report for PCT/EP2013/070764, filed Oct. 7, 2013.

(Continued)

*Primary Examiner* — John Chapman, Jr.
(74) *Attorney, Agent, or Firm* — Paul D. Bianco; Gary S. Winer; Fleit Gibbons Gutman Bongini & Bianco PL

(57) ABSTRACT

A balancing or measuring adapter, which includes a main body having a holder for the component to be balanced or measured and a clamping device assigned to the main body having a movable clamping element for clamping the component to the main body and releasing it therefrom. A braking device for generating a constant advance speed of the clamping element as it moves is arranged on the movable clamping element for precisely positioned clamping and jerk-free release of the component.

15 Claims, 4 Drawing Sheets

(56) References Cited

U.S. PATENT DOCUMENTS

| 2004/0065150 | A1 | 4/2004 | Corghi |
| 2004/0156690 | A1 | 8/2004 | Hangleiter |
| 2007/0154274 | A1 | 7/2007 | Petrescu |

FOREIGN PATENT DOCUMENTS

| DE | 10257336 | 6/2004 |
| WO | 00/45983 | 8/2000 |
| WO | 0045982 | 8/2000 |
| WO | 2004098828 | 11/2004 |
| WO | 2010073501 | 7/2010 |

OTHER PUBLICATIONS

Results of Examination Report for DE10 2012 109 633.3 filed Oct. 10, 2012.
Written Opinion for PCT/EP2013/070764, filed Oct. 7, 2013.
International Preliminary Report on Patentability for PCT/EP2013/070764, dated Apr. 14, 2015.

BALANCING OR MEASURING ADAPTER

FIELD OF THE INVENTION

The invention relates to a balancing or measuring adapter and to a balancing or measuring machine having such a balancing or measuring adapter.

BACKGROUND OF THE INVENTION

Such balancing or measuring adapters are used for clamping a rotating component onto a balancing and/or measuring machine. A balancing machine having a balancing adapter of the type in question is known from DE 299 80 181 U1. It contains a main body having a centered receiving opening for the component to be clamped and a collet actuating unit, movable relative to the main body, for a collet chuck. In this known design, the collet chuck is fixedly mounted on the main body and is not movable axially relative thereto. The clamping tongues of the collet chuck are movable between a clamping and a release position by axially displacing the collet actuating unit. Additional centering elements, by which the components to be measured or balanced can be pre-tensioned radially, are often provided in the receiving opening region. In order to be able to release the clamped components after balancing or measurement, it also is necessary for the collet actuating unit to overcome the additional forces applied by the centering elements. For this purpose, the forces of the collet actuating unit must be increased, which can lead to jerky movements of the collet actuating unit. Since the axial movement of the collet actuating unit is generally also used to press the component out of the balancing or measuring adapter, there can be an undesired abrupt ejection of the components to be balanced or measured from the main body. This is particularly the case if the ejection is accomplished with compressed air.

SUMMARY OF THE INVENTION

A balancing or measuring adapter that enables an accurately positioned clamping and shock free release of a component is disclosed.

Expedient improvements and advantageous embodiments of the invention are also disclosed.

In the balancing or measuring adapter according to the invention, a braking device for producing a constant advance speed of the clamping element during movement thereof is arranged on the movable clamping element. Thereby abrupt movements of the clamping element and uncontrolled ejection movements caused thereby can be avoided. Kinetic energy can be absorbed by the braking device and the collision speed of the clamping element during ejection of the components to be balanced or measured can be reduced. Bounce-back of the moved masses can also be avoided.

In a particularly expedient embodiment, the braking device can comprise one or more fluid brakes arranged with a distance between one another in the circumferential direction, each having a brake piston movable inside a holder. The fluid brakes can preferably be designed as hydraulic dampers with a hydraulic fluid as the brake fluid.

In an embodiment with an advantageous design, the braking device can be arranged between the main body and an actuating piston of the clamping device. The braking device could also be arranged between the actuating piston and an additional actuating element associated with the clamping element, however.

In a simple and advantageous embodiment, the brake piston can be axially displaceable inside a holder constructed as a bore and is sealingly guided by a radial seal. The holder, formed as a bore, can be arranged in the actuating piston and the brake piston can be arranged on the main body. It is also possible, however, to provide the brake piston on the actuating piston and the associated holder on the main body.

In another possible embodiment, however, the brake piston can be arranged displaceably in a holder constructed as a hollow cylindrical outer body and contain an outward-projecting piston rod. The lower end of the piston rod can engage via an end button with bores on the upper side of the actuating piston.

The outer body can be arranged in corresponding axial bores of a lower part of the main body and be supported at the upper end on the underside of an upper part of the main body.

The fluid brakes expediently contain a through-opening arranged inside the piston for connection to two chambers filled with a fluid. When a force is applied to the fluid brake, the fluid must flow through the through-opening. The resulting static pressure produces the opposing force required for movement control.

In another advantageous embodiment, at least one centering element for centric mounting of the component inside the main body is inserted into the holder. Thereby it is possible to achieve a precisely positioned and centered accommodation of the component inside the main body.

In one possible embodiment, for example, the clamping device can comprise a collet chuck and an axially displaceable clamping element for actuating the collet chuck. In a simple embodiment, however, the clamping device can also be constructed as a threaded rod for engagement with the component to be balanced or measured. Other suitable clamping devices for centered clamping are also conceivable. The clamping element can contain a rod-like guide region, by which the clamping element is displaceably mounted in the main body via a bearing sleeve. The clamping element can contain an actuating head, on which an outer conical surface and a cylindrical region having a cylindrical outer surface for contact with clamping tongues of the collet chuck are provided.

The invention further relates to a balancing or measuring machine containing a balancing or measuring adapter having the above-described features.

BRIEF DESCRIPTION OF THE DRAWINGS

Additional details and advantages of the invention emerge from the following description of preferred embodiments with reference to the drawings. In the drawing.

DETAILED DESCRIPTION OF THE INVENTION

Figure 1:
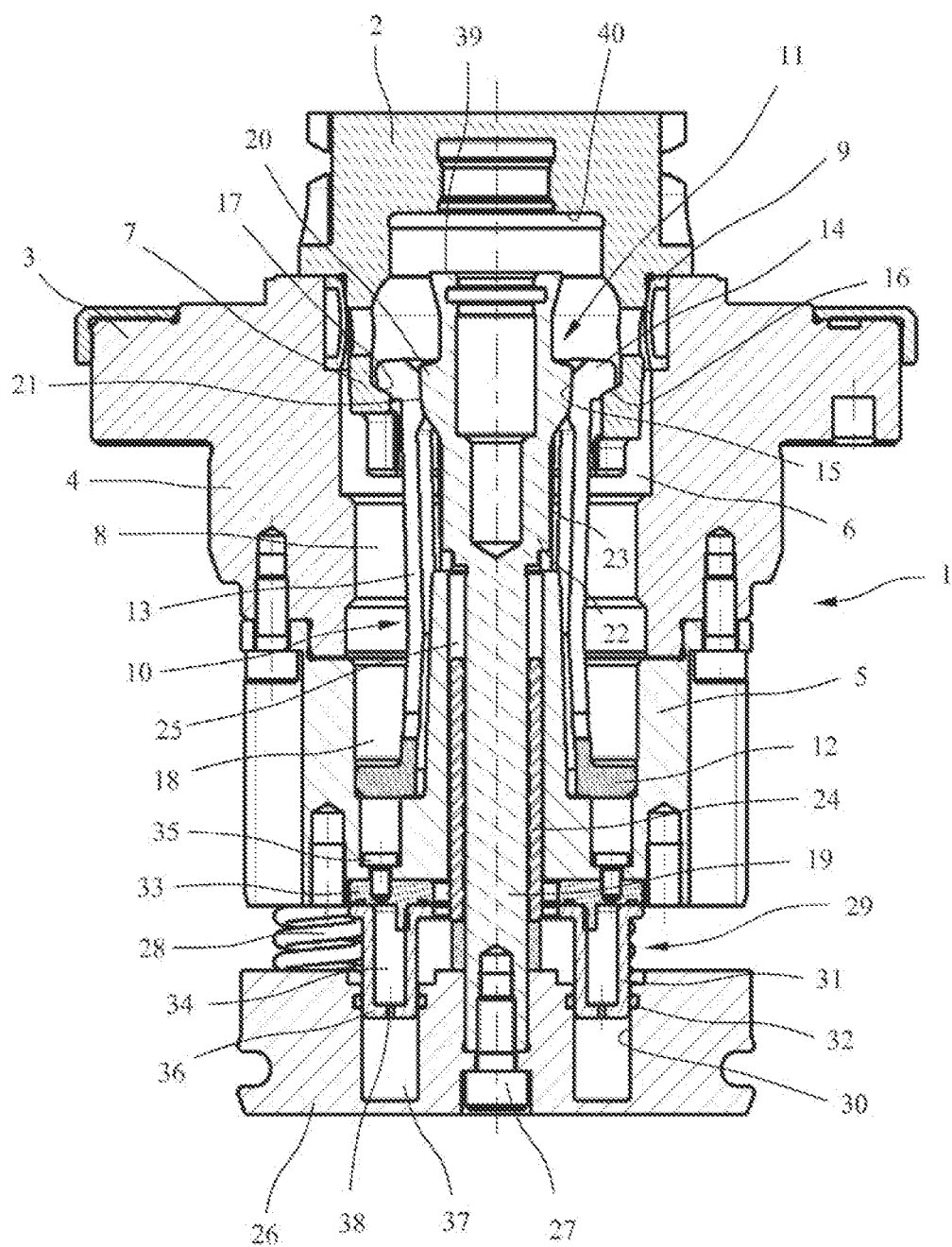
FIG. 1: shows a longitudinal section of a first embodiment of a balancing or measuring adapter according to the invention in a clamped position.
Figure 2:
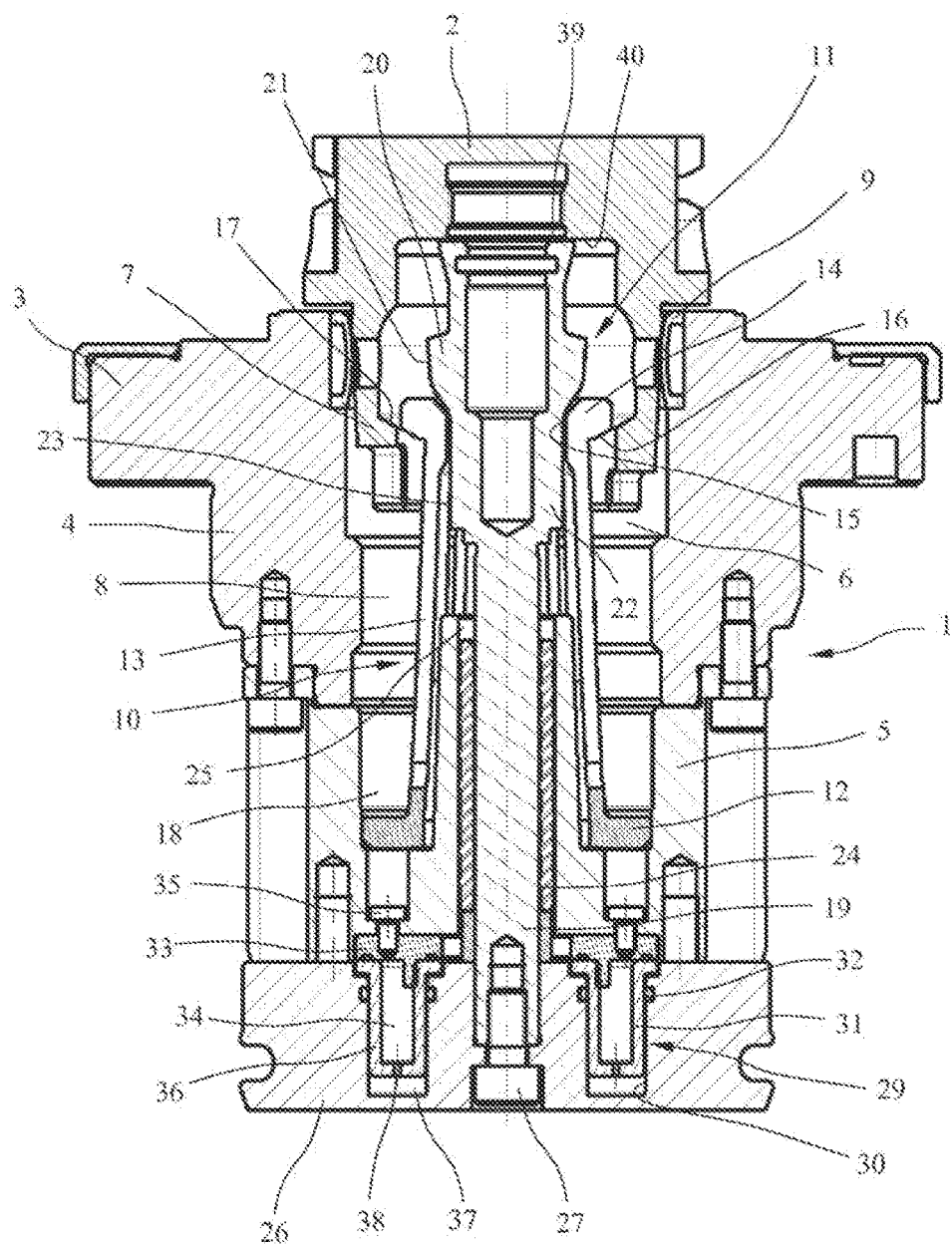
FIG. 2: shows a longitudinal section of the balancing or measuring adapter from FIG. 1 in a release position.

The balancing or measuring adapter 1 shown in a clamped and a release position in FIGS. 1 and 2 is conceived for clamping a rotating component 2 on a balancing or measuring machine. Centered, highly precise and repeatable holding of the component 2 to be balanced or measured is of particular importance in such machines. The balancing or measuring adapter 1 contains a main body, which can be inserted into the drive spindle of the balancing or measuring machine, for example, and which consists in the illustrated embodiment of a hollow cylindrical upper part 4 furnished with a flange 3 and a lower part 5 screwed onto the upper part. The main body can be mounted on the upper side of the drive spindle by means of the flange 3, for example.

The upper part 4 has a holder 6, formed as an opening for a shaft 7 of the component 2 to be clamped, and a lower passage area 8. The holder 6 can also be designed as a flat support or the like. The component 2 can be a tool holder for a drilling, milling or grinding tool, a rotor or some other machine part to be balanced or measured. The shaft 7 is shaped conically and can have a polygonal, circular or other suitable cross section. The holder 6 in the upper part 4 is conical and has an inner contour matched to the cross section of the shaft 7. A centering element 9 constructed as a clamping ring, for example, for centered mounting of the component 2 in the main body is inserted into the holder 6 in the upper part 4.

A collet chuck 10 and a clamping element 11 coaxial with the collet chuck are arranged in the main body, composed of the upper part 4 and the lower part 5, in order to actuate the collet chuck 10. The collet chuck 10 has a sleeve-like socket 12 and a plurality of radially resilient clamping tongues 13 separated from one another by axial slots, along with a clamping region 14, formed as a thickened portion, at the free, anterior end of the clamping tongues 13 facing the component 2 to be clamped. At the clamping region 14, the clamping tongues 13 have an inner contact surface 15 for contacting the actuating element 11, and an outer contact surface 16 for contacting an inner opposing surface 17 on the inner side of the shaft 7 of the component 2. The collet chuck 10 is mounted in an annular grove 18 of the lower part 5 by means of the sleeve-like socket 12, with the aid of bolts that are not shown.

The clamping element 11 contains a lower, rod-like guide region 19 and an upper actuating head 20 that comprises an outer conical surface 21 and a cylindrical region 22 therebelow having a cylindrical outer surface 23. The clamping element 11 is guided by the rod-like guiding region 19, via a bearing sleeve 24 provided with rolling bodies, so as to be movable axially in a through-bore 25 in the lower part 5 of the main body. An actuating piston 26 is mounted with the aid of a bolt 27 at the end of the rod-shaped guidance area 19 protruding downward relative to the lower part 5. By means of the clamping element 11, the elastically resilient clamping tongues 13 of the collet chuck 11 are movable between a clamped position shown in FIG. 1 and a release position shown in FIG. 2.

Compression springs 28 that are visible in FIG. 1 are tensioned between the lower part 5 and the piston 26. For stable retention, the compression springs 28 are inserted into blind holes, not visible, in the lower part 5 and in the piston 26. The clamping element 11 is pressed by these compression springs 28 into the clamped position shown in FIG. 1. By displacing the actuating piston 26 against the force of the compression springs 28, the actuating element 11 can be pushed from the clamping position shown in FIG. 1 into the release position shown in FIG. 2. For this purpose, the actuating piston 26 can be movably arranged, sealed via a radial seal, in the drive spindle of the balancing or measuring machine and can be impinged upon from the lower side with compressed air.

A braking device 29 having a plurality of fluid brakes with a distance between one another in the circumferential direction is additionally arranged between the lower part 5 of the main body and the actuating piston 26. The fluid brakes have a radially sealed brake piston 31 guided inside a receptacle 30. In the embodiment shown, the brake pistons 31 are displaceable, sealed by means of radial seals 32, in receptacles 30 formed as bores in the upper side of the actuating piston 26, facing the lower part 5. The brake pistons 31 contain a first chamber 34 sealed by a cover 33 and are fastened to the underside of the lower part 5 with the aid of bolts 35 facing downward via the cover 33. A second chamber 37 is delimited between a bottom 36 of the brake piston 31 and the receptacles 30 constructed as bores. A through-opening 38 for connecting the first chamber 34 to the second chamber 37 is provided in the bottom 36 of the brake piston 31.

The operation of the above-described balancing or measuring adapter will be explained below with reference to FIGS. 1 and 2.

The balancing adapter 1 is shown in the clamped position in FIG. 1. In this position, the clamping element 11 is pressed downward via the compression springs 28 tensioned between the actuating piston 24 and the lower part 5. By means of the outer conical surface 21 on the upper actuating head 20 of the clamping element 11, the clamping regions 14 at the upper, free ends of the clamping tongues 13 are pressed radially outward, so that the outer clamping surfaces 16 come into contact with the inner mating surface 17 on the inner side of the shaft 7 and pull it into the holder opening 6.

By applying pressure to the actuating piston 26 with compressed air or some other pressure fluid, the clamping element 11 can be pressed upward against the force of the compression springs 28 into a release position shown in FIG. 2. The clamping regions 14 of the clamping tongues 13 can also come into contact at their inner contact face 15 with the cylindrical outer surface 23 on the cylindrical region 22 of the clamping elements 11. Because the clamping element 11 has a larger diameter in the upper conical region 20 than in the cylindrical region 22 arranged thereunder, the front clamping regions 14 of the collet chuck 13 can tilt radially inward and release the component 2 for removal or insertion into the balancing adapter 1. The clamping element 11 has, at the upper end thereof, an upper end face 39, which comes into contact with an interior flat surface 40 in the release position shown in FIG. 2, and presses out the component 2.

When the brake piston 31 extends into the receptacles 30 formed as bores, the pressure fluid present in the chamber 37 is displaced via the through-opening 38 into the chamber 34. The resulting static pressure produces the opposing force required for controlling the advancing movement. A constant advancing speed of the collet actuating unit over the stroke thereof can be achieved with the aid of the braking device 29, and thereby an abrupt outward movement of the clamping element 11 can be avoided. Even in the event of a sudden application of pressure to the actuating piston 26, the clamping element 11 moves at a constant speed, so that an abrupt impact of the clamping element 11 on the component 2 at a high collision speed and the resulting uncontrolled ejection of the component 2 can be avoided.

Figure 3:
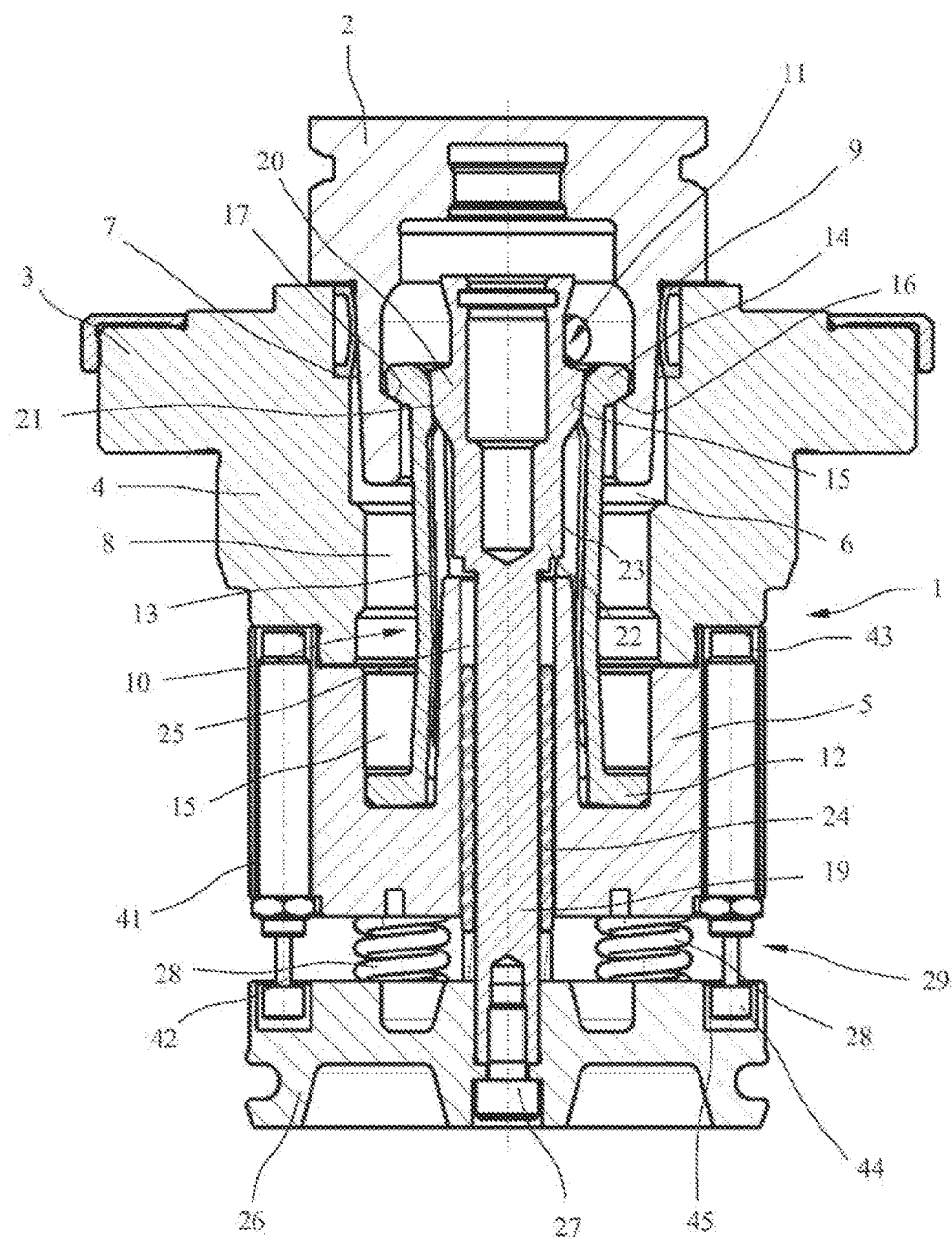
FIG. 3: shows a longitudinal section of a second embodiment of a balancing or measuring adapter according to the invention in a clamped position.
Figure 4:
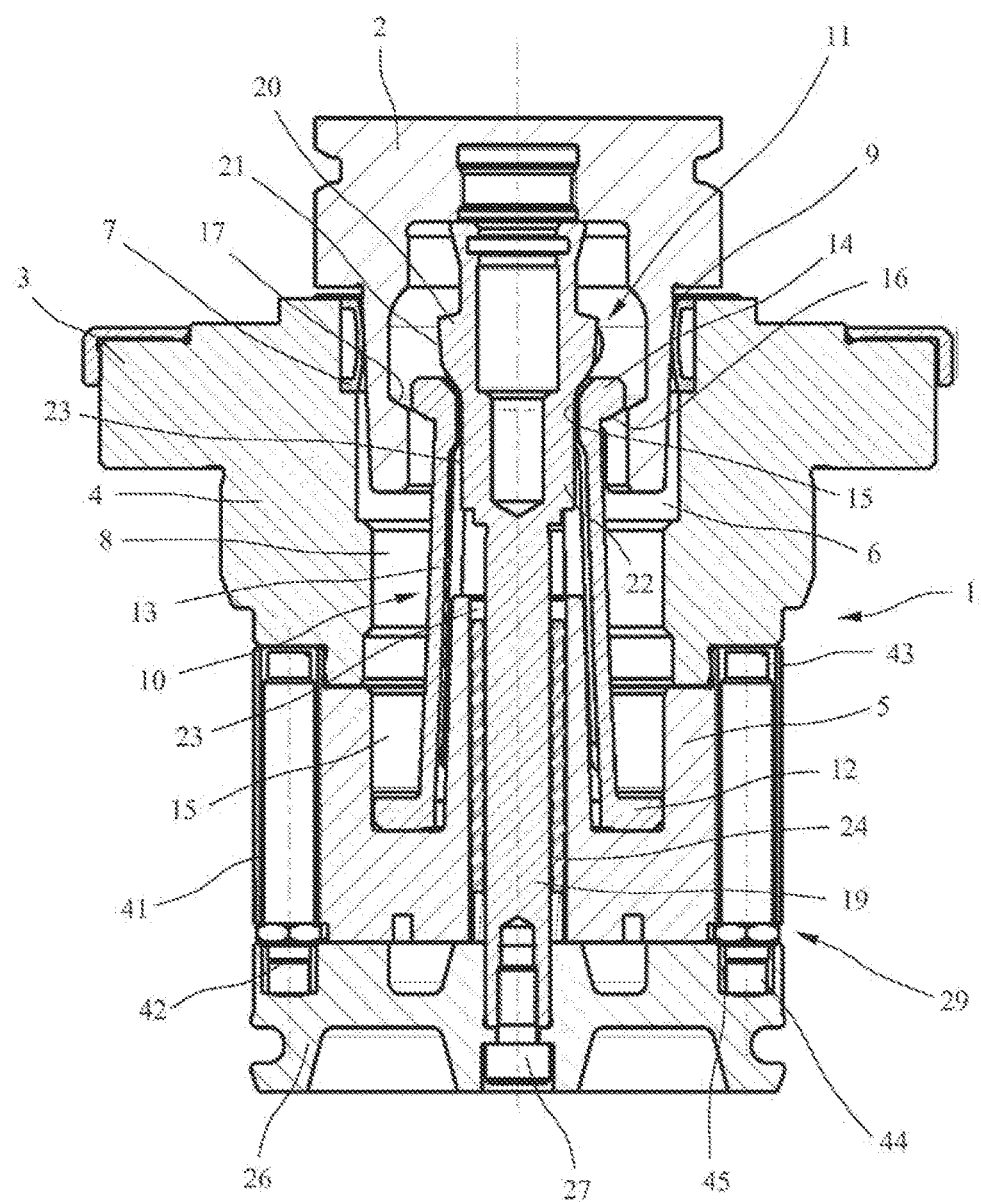
FIG. 4: shows a longitudinal section of the balancing or measuring adapter from FIG. 3 in a release position.

FIGS. 3 and 4 show another embodiment of a balancing or measuring adapter 1. This embodiment corresponds in its basic structure and mode of operation to the embodiment in FIGS. 1 and 2, and therefore corresponding components are provided with the same reference numbers. Here too, a collet chuck 10 having a plurality of radially resilient clamping tongues 13 is arranged in a main body composed of an upper part 4 and a lower part 5. The clamping tongues 13 are movable between a clamping and a release position by a collet actuating unit 11 associated with the collet chuck 10 and by an actuating piston 26. Compression springs 28 that are visible in FIG. 1 are tensioned between the lower part 5 and the piston 26. The actuating element 11 is pressed by these compression springs 28 into the clamped position shown in FIG. 3. A braking device 29 having a plurality of fluid brakes distributed uniformly in the circumferential direction is also present in this embodiment.

Differing from the embodiment of FIGS. 1 and 2, the fluid brakes here have a holder 41 constructed as hollow cylindrical outer body and an axially movable outward-projecting piston rod 42 therein. The outer body 41 is arranged in corresponding axial bores 43 of the lower part 5 and is supported at its upper end on the underside of the upper part 4. The lower end of the downward-projecting piston rods 42 engages via an end button 44 with bores 45 on the upper side of the actuating piston 26. Here too, a constant advancing speed of the collet actuating unit is achieved by means of the fluid brakes.

The invention is not limited to the embodiment described above and illustrated in the drawings. Thus different braking elements for producing a constant advancing speed of the clamping element can be provided. In addition, the clamping system can be used analogously also for clamping processes in which the radial clamping movement progresses from the outside to the inside.

The invention claimed is:

1. A balancing or measuring adapter comprising:
   a main body having a holder for a component to be balanced or measured;
   a clamping device associated with the main body and comprising a movable clamping element for clamping the component to the main body and releasing the component therefrom; and
   a braking device arranged between the main body and an actuating piston of the movable clamping element for generating a constant advance speed of the clamping element in a release movement,
   wherein the braking device comprises one or more fluid brakes at a distance from one another in the circumferential direction, the braking device having a brake piston displaceable axially inside a holder,
   wherein the brake piston is axially displaceable inside a holder constructed as a bore and is sealingly guided by a radial seal, and
   wherein the holder is arranged in the actuating piston, and the brake piston is arranged on the main body.

2. The balancing or measuring adapter according to claim 1, wherein the one or more fluid brakes contain a through opening arranged inside the piston, for connection to two chambers filled with a fluid.

3. The balancing or measuring adapter according to claim 1, wherein at least one centering element for centric mounting of the component inside the main body is inserted into the holder.

4. The balancing or measuring adapter according to claim 1, wherein the clamping device comprises a collet chuck and an axially displaceable clamping element for actuating a collet chuck.

5. The balancing or measuring adapter according to claim 4, wherein the clamping element contains a rod-like guide region, by which the clamping element is displaceably mounted in the main body via a bearing sleeve.

6. The balancing or measuring adapter according to claim 4, wherein the clamping element has an actuating head having an outer conical surface and a cylindrical region having a cylindrical outer surface for contact with clamping tongues of the collet chuck.

7. The balancing or measuring machine having a balancing or measuring adapter, wherein the balancing or measuring adapter is constructed according to claim 1.

8. A balancing or measuring adapter comprising:
   a main body having a holder for a component to be balanced or measured;
   a clamping device associated with the main body and comprising a movable clamping element for clamping the component to the main body and releasing the component therefrom; and
   a braking device arranged between the main body and an actuating piston of the movable clamping element for generating a constant advance speed of the clamping element in a release movement,
   wherein the braking device comprises one or more fluid brakes at a distance from one another in the circumferential direction, the braking device having a brake piston displaceable axially inside a holder,
   wherein the brake piston is arranged displaceably in a holder constructed as a hollow cylindrical external body and contains an outward-projecting piston rod, and
   wherein a lower end of the piston rod engages via an end button with bores on an upper side of the actuating piston.

9. The balancing or measuring adapter according to claim 8, wherein the external body is arranged in corresponding axial bores of a lower part of the main body and is supported at an upper end on an underside of an upper part of the main body.

10. The balancing or measuring adapter according to claim 8, wherein the one or more fluid brakes contain a through opening arranged inside the piston, for connection to two chambers filled with a fluid.

11. The balancing or measuring adapter according to claim 8, wherein at least one centering element for centric mounting of the component inside the main body is inserted into the holder.

12. The balancing or measuring adapter according to claim 8, wherein the clamping device comprises a collet chuck and an axially displaceable clamping element for actuating a collet chuck.

13. The balancing or measuring adapter according to claim 12, wherein the clamping element contains a rod-like guide region, by which the clamping element is displaceably mounted in the main body via a bearing sleeve.

14. The balancing or measuring adapter according to claim 12, wherein the clamping element has an actuating head having an outer conical surface and a cylindrical region having a cylindrical outer surface for contact with clamping tongues of the collet chuck.

15. The balancing or measuring machine having a balancing or measuring adapter, wherein the balancing or measuring adapter is constructed according to claim 8.

* * * * *